(No Model.) 8 Sheets—Sheet 1.
W. H. DAYTON.
HORSESHOE NAIL MACHINE.

No. 497,493. Patented May 16, 1893.

Witnesses
G. M. Nottingham
G. F. Downing

Inventor
W. H. Dayton
By H. A. Seymour
Attorney (No Model.) 8 Sheets—Sheet 2.

W. H. DAYTON.
HORSESHOE NAIL MACHINE.

No. 497,493. Patented May 16, 1893.

Witnesses
G. Nottingham
G. F. Downing

Inventor
W. H. Dayton
By H. A. Seymour
Attorney

(No Model.) 8 Sheets—Sheet 3.
W. H. DAYTON.
HORSESHOE NAIL MACHINE.

No. 497,493. Patented May 16, 1893.

(No Model.) 8 Sheets—Sheet 4.
W. H. DAYTON.
HORSESHOE NAIL MACHINE.

No. 497,493. Patented May 16, 1893.

(No Model.) 8 Sheets—Sheet 5.

W. H. DAYTON.
HORSESHOE NAIL MACHINE.

No. 497,493. Patented May 16, 1893.

Witnesses
E. A. Nottingham
G. F. Downing

Inventor
W. H. Dayton
By H. A. Seymour
Attorney

(No Model.) 8 Sheets—Sheet 6.
W. H. DAYTON.
HORSESHOE NAIL MACHINE.

No. 497,493. Patented May 16, 1893.

Witnesses
[signature]
G. F. Downing.

Inventor
W. H. Dayton
By H. A. Seymour
Attorney (No Model.) 8 Sheets—Sheet 8.

W. H. DAYTON.
HORSESHOE NAIL MACHINE.

No. 497,493. Patented May 16, 1893.

Witnesses
C. Nottingham
G. F. Downing

Inventor
W. H. Dayton
By H. A. Seymour
Attorney

UNITED STATES PATENT OFFICE.

WILLIAM H. DAYTON, OF TORRINGTON, CONNECTICUT.

HORSESHOE-NAIL MACHINE.

SPECIFICATION forming part of Letters Patent No. 497,493, dated May 16, 1893.

Application filed July 19, 1892. Serial No. 440,502. (No model.)

*To all whom it may concern:*

Be it known that I, WILLIAM H. DAYTON, of Torrington, in the county of Litchfield and State of Connecticut, have invented certain new and useful Improvements in Horseshoe-Nail Machines; and I do hereby declare the following to be a full, clear, and exact description of the invention, such as will enable others skilled in the art to which it appertains to make and use the same.

My invention relates to an improvement in horse shoe nail machines, the object being to provide a machine for automatically feeding horse shoe nail blanks to reducing or swaging dies whereby the shank of the nail is reduced to a tapering form circular in cross section.

With this object in view the invention consists in certain novel features of construction and combinations of parts as will be hereinafter described and pointed out in the claims.

In the accompanying drawings, Fig. 8 is a view in side elevation of the gripping jaws. Fig. 9 is a plan view of the same.

A represents a hollow standard, the lower end of which is provided with flanges $c$ to which are secured the feet $b$ $b$ which serve to insure a sufficiently extended bearing for the machine to retain it steady while in operation. The upper end of standard A is furnished with a cylindrical bearing in which is supported the sleeve $a$ having the cylindrical head B formed integral therewith. The sleeve and head are secured against movement or displacement by the set screw $a'$.

Within the sleeve or elongated bearing $a$ is journaled the shaft D to the outer end of which is fastened a pulley D' through which power is transmitted to the shaft. The opposite end of the shaft D has either formed integral therewith or secured thereto the rotary head $D^2$ which is provided with a transverse slot within which are placed the dies F F, and the sliding hammer blocks G G.

Between the cylindrical inner wall of the stationary head B, and the outer periphery of the rotary head $D^2$ are placed the rings H H. Each one of these rings is provided with any desired number of radial slots $d$ which extend from the outer periphery of the ring partly through its width. Within these slots $d$ are placed the pintles $e$ which are constructed with square or angular ends and cylindrical central portions. The angular shaped ends of the pintles fit within the slots in the rings H H and hence are prevented from rotating, while they are allowed a radial movement. Upon the pintles are journaled the rollers I and hence as will be observed a series of rollers is interposed between the stationary and the rotary heads. The rings H H are fastened together by pins $f$, so that the rollers are kept in alignment.

To the outer face of the rotary head is secured by suitable screws the centering plate J, which is constructed with a concave recess having a central aperture $j'$ through which latter the blank is fed to the dies.

On opposite sides of plate J, are located the adjusting plates K, each of which is furnished with elongated slots $k$, $k$, through which the bolts $k'$ extend into the rotary head. By means of the nuts $k^2$ and washers $k^3$ the plates K are secured in any desired adjustment.

Each hammer-block G G is provided with an elongated recess $k^4$ into which extends a pin $k^5$ fastened to the plate K. By varying the adjustment of the plate the throw or range of movement of the hammer block may be readily regulated.

On the inner face of each die F is formed a groove tapering throughout its length and semi-circular in shape, so that when placed together the two grooves are of the form to which the shank and the under side of the head, or the shoulder connecting the head and shank of a nail blank, will be reduced by the swaging operation.

The series of rollers and the rings in which they are mounted are retained in place by means of the annular face plate $K^2$ which is fastened to the stationary head B. The shaft D being rotated rapidly operates to impart a rapid motion to the rotary head the effect of which is to throw the dies F F and hammer blocks G G outwardly by centrifugal force, but as the rear ends of the hammer-blocks come in contact with the rollers I, the latter operate as rolling abutments and serve to force the hammer blocks and dies radially inward and thereby impart a swaging blow upon the blank between the dies. The rollers I are arranged in pairs the two rollers of each pair being located on diametrically opposite sides of the center of the rotary disk so that the two dies F F are forced inwardly and caused to act simultaneously on the opposite sides of the blank. By arranging a series of rollers I within the head, a number of blows will be given the blank at each revolution of the head. In the drawings I have shown six pairs of rollers, and hence the blank is subjected to six blows on the opposite sides at each revolution of the rotary head.

To the stationary head B are bolted the brackets L L with which are connected or cast integral the bed piece or frame L' which extends horizontally outward in front of the head.

M is a reciprocating table the side edges of which are supported in suitable guides M', M'.

Upon the rear end of table M are mounted the posts $m, m$, in which is journaled the rocking bar $m'$. The screw threaded end $m^3$ of a connecting rod $M^2$ is inserted through a hole formed in the rocking bar $m'$ and is adjustably secured thereto by means of the nuts $m^3$ and $m^4$. The outer end of connecting rod $M^2$ is pivotally connected to the upper end of the lever N which is journaled on the shaft N'. The shaft N' is supported in bearings formed in the depending brackets $N^2 N^2$ fastened to the bed or frame L'.

To the lower end of arm $N^3$ of lever N is secured one end of a spiral spring O the opposite end of which is fastened to the standard A. Spring O exerts its power through the lever N to pull the table M to the limit of its rearward movement. The forward movement of table M is effected through the action of the cam P on the friction roller P' journaled in the end of an arm $P^2$ formed or rigidly connected with lever N. The cam face formed on the periphery of cam P acting upon the friction roller P', serves to force the latter downward, and as the lever N and arm $P^2$ together form a bell-crank lever journaled at N' the bell crank lever is rocked on its bearing by the depression of the arm $P^2$ and the table M is moved forward toward the head of the machine. Cam P is fastened to a driven shaft Q journaled in depending bracket bearings Q', Q'. To one end of shaft Q is secured a worm gear $Q^2$ with which meshes a worm $Q^3$ on the longitudinally arranged driving shaft R which is journaled in bracket bearings attached to the side of the machine.

R' is a clutch on shaft R and $R^2$ is a clutch lever for moving the sliding member of the clutch into and out of engagement with the fixed member. Shaft R is provided with a band pulley S, through which power is transmitted to revolve the shaft and mechanism connected therewith.

Upon the reciprocating table M is mounted the bearing plate $M^2$ which is secured between laterally adjustable bearings $t^2 t^2$ which engage its side edges. Plate $M^2$ is provided with end bearings or guides $t\ t'$ in which is held the gripper head or stock T. Figs. 8 and 9 are detached views of the gripper head and jaws.

Figures 5, 6:
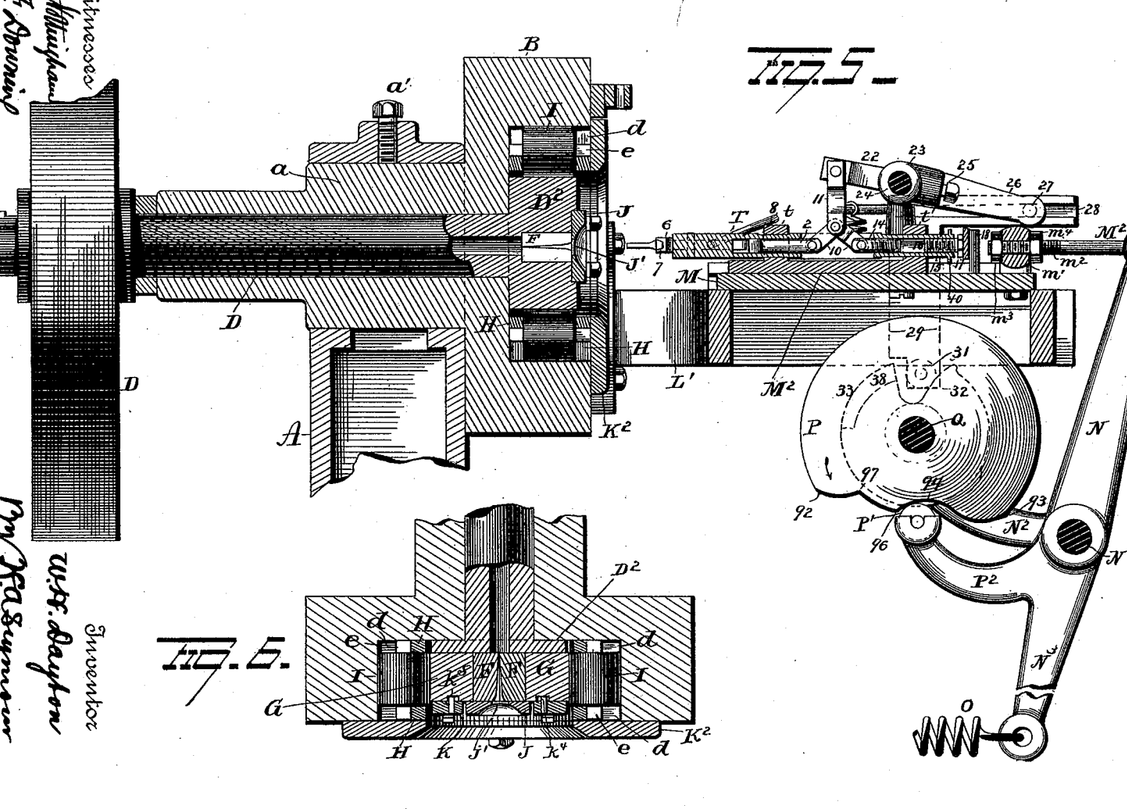
Fig. 5 is a longitudinal section.
Fig. 6 is a transverse section taken through the head and reducing or swaging dies.
Figure 5:
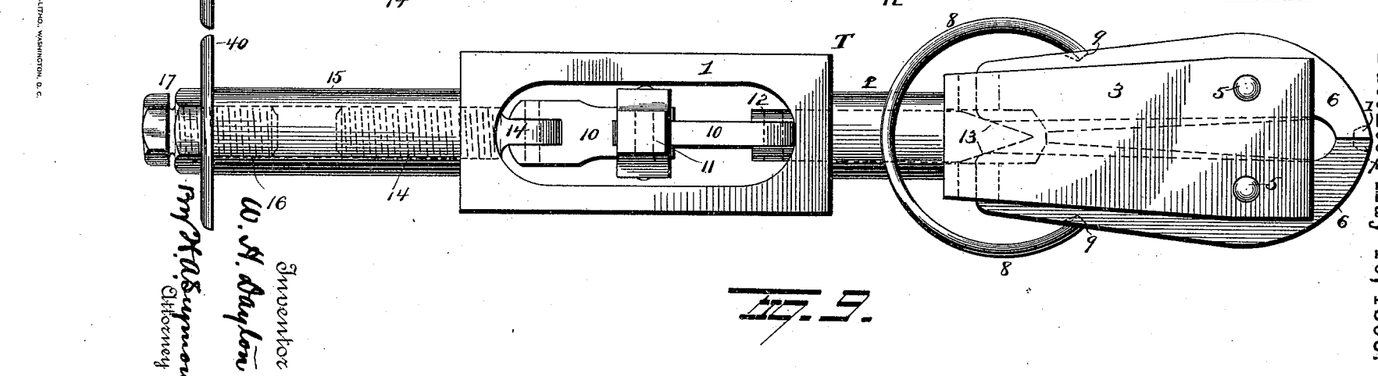

1 is a central yoke provided at its forward end with a tubular arm 2 to the outer end of which is connected or is formed integral therewith the bifurcated gripper head 3. Within the transverse slot 4 in the head are pivoted at 5, 5, the gripping jaws 6, 6, the outer ends of which are curved and are provided on their meeting faces with recesses 7, 7, so formed that when the jaws are closed they will firmly grasp the head of a horse shoe nail blank. The opposite ends of a spring bail 8 engage in recesses 9, 9, formed in the rear ends of the jaws and serve to retain them normally open, by forcing their rear ends toward each other. A toggle lever consisting of the lever arms 10, 10 and 11, operate to reciprocate the wedge pointed rod by which the gripper jaws are closed and opened at the proper times to grasp and release the nail blank. The lower end of one of the arms 10 is pivoted to the rear end of the sliding bar 12 which is supported so as to slide freely within the tubular arm or sleeve 2. The forward end of bar 12 is provided with a wedge 13 which engages the rear ends of the gripping jaws 6, 6, and serves to force their rear ends apart and thus close their forward and gripping ends. When the wedge is retracted the spring bail operates to force the rear ends of the jaws toward each other and thereby separate their outer ends. The lower end of the outer toggle arm 10 is pivoted to the screw plug 14, which is adjustably secured within the tubular arm or stock 15 connected with the rear end of the yoke 1. Within the rear end of the stock 15 is screwed a bolt 16, the end of which is provided with an angular shaped head 17 to admit of the adjustment of the bolt. Head 17 abuts against a stout flat spring plate 18 which is provided with open slots 19, 19 at its opposite ends. Within these slots extend the pins 20, 20, on the posts 21, 21 attached to the reciprocating plate or bed piece M. By means of the spring plate 18, the gripper stock and gripper jaws are allowed a slight yielding movement which insures an easy action to the different parts of the mechanism connected with the gripping jaws, and further the spring plate takes up any slight lost motion which results from the uneven wear of the parts. The upper ends of the arms 10, 10 are pivoted to the lower end of arm 11, the upper end of which is pivoted to the rocking arm 22. Arm 22 is constructed with a sleeve 23 which is mounted upon a rock-shaft 24 and is adjustably secured thereto by a set screw 25. When the outer end of the rocking arm 22 is raised as illustrated in Fig. 5, the wedge is withdrawn from the rear ends of the gripping jaws thereby allowing the spring bail to open their forward or gripping ends. When the rocking arm is moved in the opposite direction, the toggle levers are moved into the position shown in Figs. 8 and 9, which results in the wedge being forced between the rear ends of the gripping jaws and firmly closing their forward and gripping ends.

Figure 3:
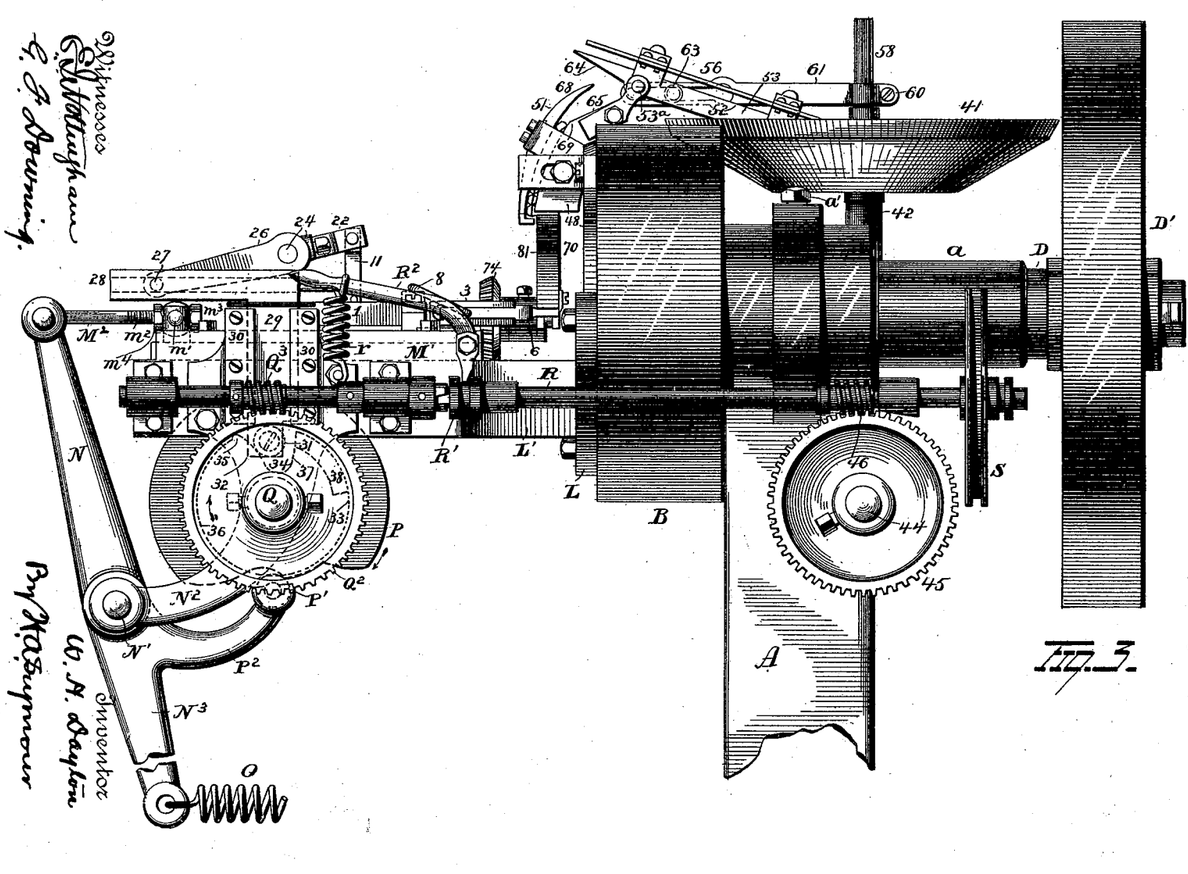

To one end of the rock shaft 24 is rigidly secured the crank-arm 26 provided at its outer end with a crank pin 27 which latter engages a groove 28 formed in the vertically reciprocating frame or plate 29. The plate 29 is fitted to move vertically within guides 30 30 attached to the side of the machine frame. A roller 31 is journaled in the lower end 32 of plate 29 and engages a cam 33 which is fastened on the revolving shaft Q. Cam 33 represented in dotted lines in Fig. 3 is there shown when moved to a position to partly close the toggles. It revolves in the direction indicated by the arrow, and by the engagement of the roller 31 with that portion of the cam face between 34 and 35, the roller and plate are gradually raised until the toggle arms have been depressed and the wedge firmly driven between the rear ends of the gripping jaws. It will be observed that the cam is furnished with a slight projection at 35 the purpose of which is to drive the wedge forcibly between the jaws at the outset, and then the cam drops back slightly and rests upon the cam surface 36 whereby the cam roller and crank pin are relieved of any undue strain or wear during the revolution of the cam, the strain or thrust being borne by the toggle arms the pivotal bearings of which are then in alignment and the spring plate which latter receives the end thrust on the toggle arms. When the cam has made nearly a complete revolution, the straight face 37 will travel past the roller, and allow the latter to fall suddenly within the slot formed in the cam. This will allow the plate or frame 29 and crank arm 26 to fall by their gravity and thereby raise the toggle arm 11 and withdraw the wedge from between the gripping jaws and allow the spring bail to open their gripping ends and release the blank held by them.

In order that the parts may act promptly in releasing the blank, I provide the cam 33 with an arc shaped face cam 38, which is flush on its outer periphery with the periphery of cam 33. When cam 33 has revolved so that the cam 38 comes beneath the lower end 39 of the plate or frame 29, the latter will be supported by cam 38 and will ride thereon until the roller has been carried over the slot. When the end of cam 38 has traveled so as to release the plate, the latter will quickly drop into the slot with the result already explained. The spring $r$ is attached to the plate and operates to force it downwardly and thus insure the prompt opening of the jaws. The rear end of the gripper head is provided with an annular flange 40 between which and the bearing $t'$ are placed on the tubular arm 13 suitable leather or other elastic washers (not shown) which serve to deaden the noise and shock of the parts when the gripper is suddenly forced forward on the release of the blank.

41 represents a conically shaped hopper into which the nail blanks are placed and from which they are automatically fed to the swaging dies. Hopper 41 is fixed to a vertically arranged sleeve 42 the lower end of which is provided with a bevel gear 43 which meshes with a bevel gear on the transverse shaft 44. To the opposite end of shaft 44 is secured a worm gear 45, which meshes with a worm 46 on the shaft R. Any suitable clutch (not shown) may be employed for throwing the worm 46 into and out of engagement with the shaft R. By the gearing above described a rotary motion is imparted to the hopper and its contents.

Figure 1:
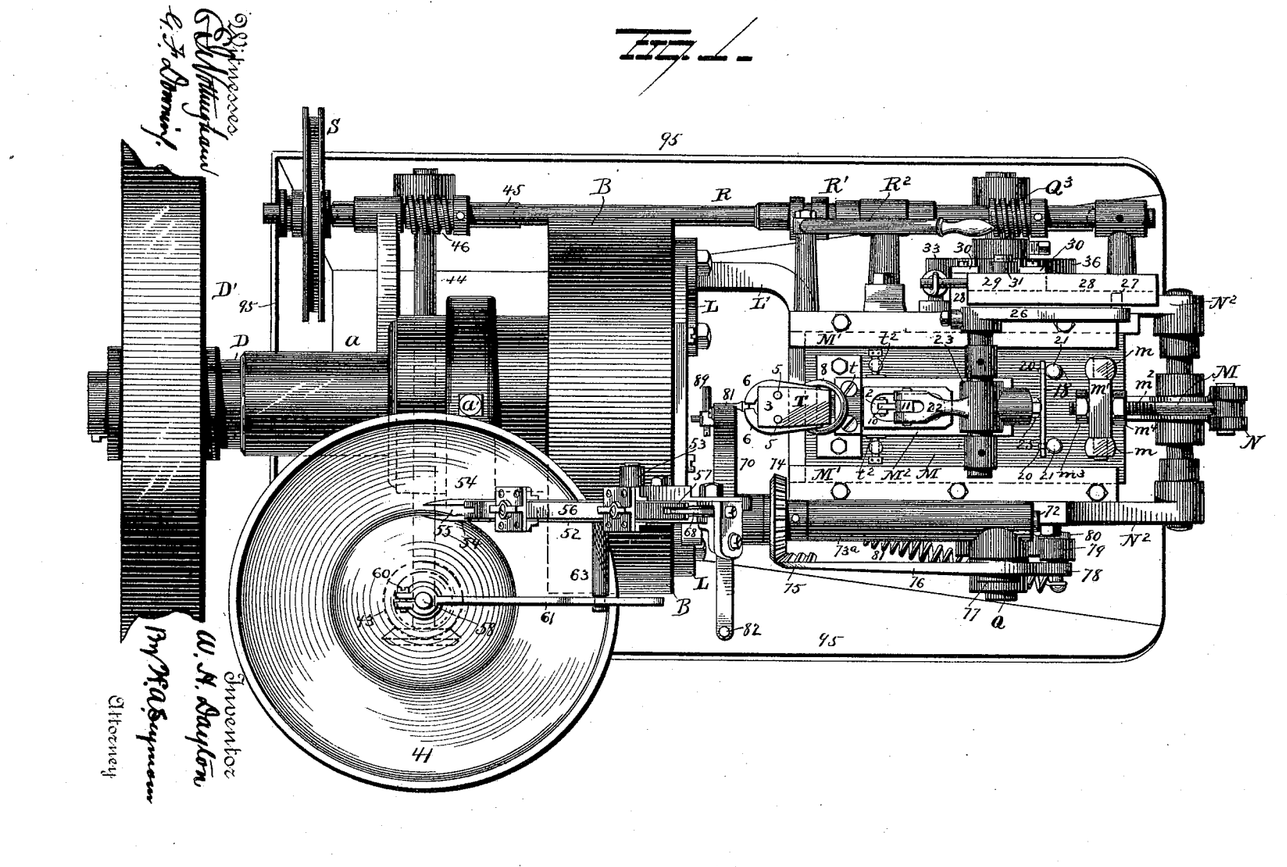
Figure 1 is a plan view of my improved machine.
Figure 2:
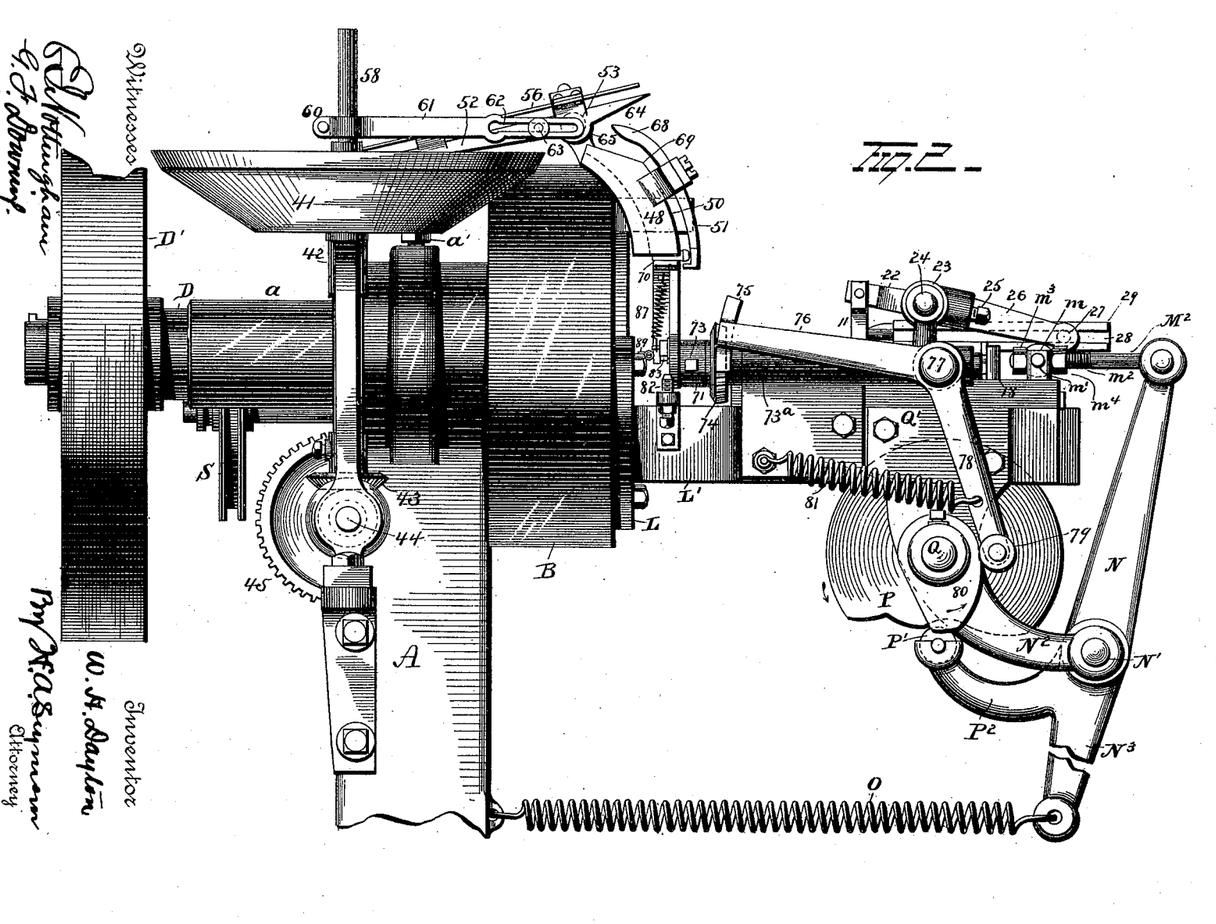
Figs. 2 and 3 are views in side elevation of the opposite sides of the machine.
Figure 4:
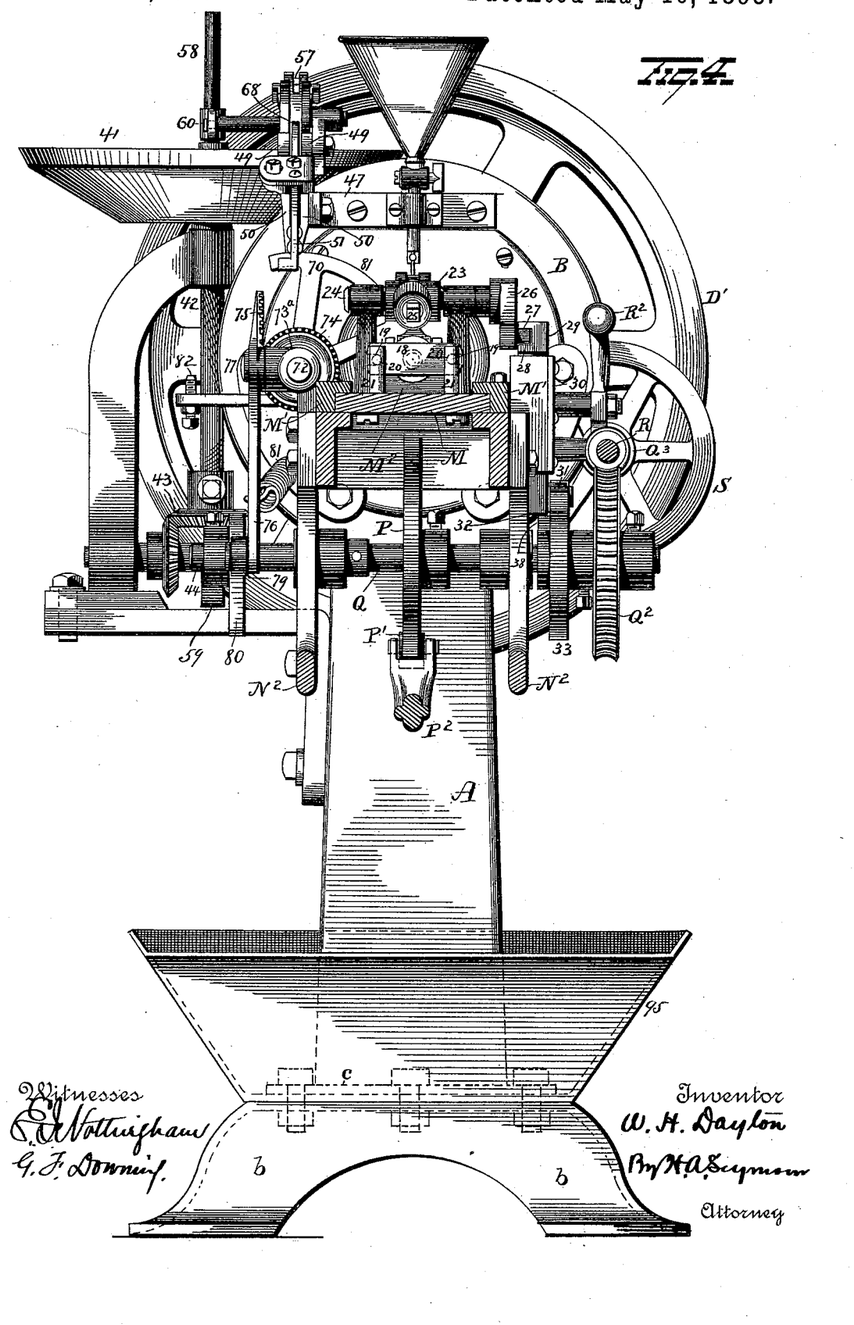
Fig. 4 is a view in end elevation, certain of the parts being shown in vertical section.
Figure 7:
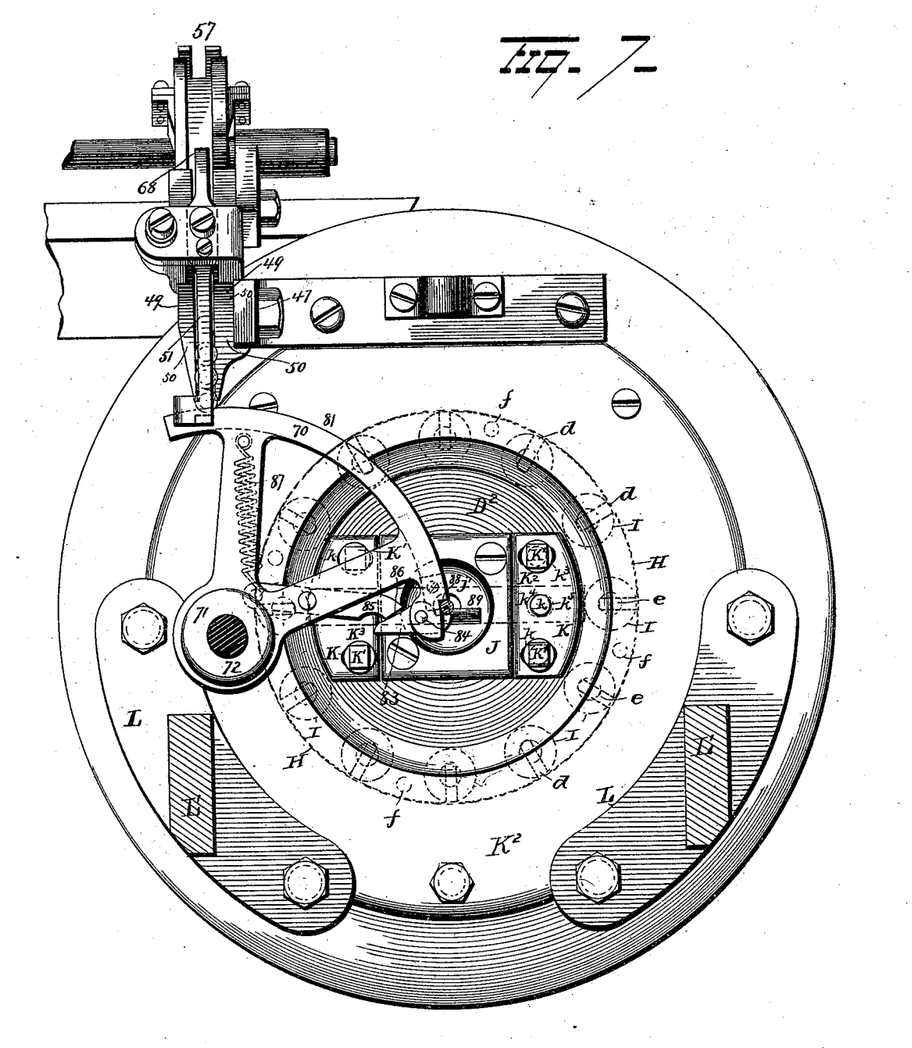
Fig. 7 is a detached view in end elevation of the head of the machine and a portion of the blank-feeding machine.

To a bracket 47 fastened to the stationary head B, is secured a curved race-way 48, which consists of the side pieces 49, 49 separated sufficiently to receive the shank portions of the blanks, but on the other hand they are sufficiently close so that their outer edges 50, 50 will form bearings for the heads of the blanks as represented in Figs. 2, 4 and 7. A curved guard 51 is secured above the race way and serves to prevent the endwise displacement of the nail blanks. A pick-up arm 53 is pivoted at 53$^a$ to a bracket connected with the raceway or any other suitable support adjacent thereto. This arm consists of the two bars or plates 54, 54, see Fig. 1, which are separated so as to form a slot 55 extending the entire length of the arm. This slot is of such width that it will readily receive the shank portion of a nail blank, but two narrow to allow of the passage through it of the head of the blank.

Located above the bars 54, 54, is a guard plate 56, the space between the guard plate and the guide bars being slightly greater than the depth of the head of the blank. One end of the guard plate 56 is bifurcated, the slot 57 being of less width than that of the head of the blank.

58 represents a vertically movable rod which extends downwardly through the hopper and the sleeve 42. The lower end of the rod is suitably pointed and rests upon a cam 59 fastened to the shaft 44, a detached view of the cam and lower end of the rod being given in Fig. 11. Hence it will be observed that at each revolution of shaft 44, the rod 58 has a vertical movement imparted thereto.

To the rod 58 is adjustably secured by the set screw 60, a horizontal arm 61, the outer end of which is provided with an elongated slot 62 through which passes a pin 63 fastened to the pick-up arm 52. Thus by the vertical movement imparted to rod 58, the pick-up arm 52 is oscillated on its pivotal bearing.

The hopper being filled with nail blanks is rotated, and during a portion of every complete revolution the pick-up arm will project downwardly into the blanks contained in the hopper as illustrated in Figs. 1 and 2 and ordinarily a few blanks will be caught between the fingers of the pick-up arm in such a manner that the heads of the blanks will rest upon the upper surfaces of the bars 54, 54, while the shank portions will depend through the slot formed between these arms. When the cam on shaft 44 raises the rod 58, the arm 61 is raised and the pickup arm is tilted so that the beveled face 64 on the under side of the short arms of the bars 54, 54, will rest upon the inclined faces 65, on the raceway. It will be observed that the slot 57 in the end of guard plate 56, and the slot 55 formed between the ends of the bars 54, 54, while of less width than that of the heads of the blanks, is sufficiently wide to allow the end 64 of the curved and stationary guard 51 to pass through them. When the pick-up arm is tilted into the position described, its angle will be sufficiently sharp to cause the nail blanks to slide by their gravity into the curved race-way. While the pickup arm will not act to pick up any predetermined number of blanks at each revolution of the hopper still experience has demonstrated the fact that it will keep the race way always supplied with blanks.

The following provision is made for preventing the pick-up arm from picking up blanks when the race way is completely filled: Suppose the race-way is filled to the point 69. The pick-up arm on being tilted will allow the blanks contained therein to slide down into contact with the uppermost blank in the race way, but owing to the fact that the heads of the blanks remaining in the arms of the pickup will engage the stationary guard 51 and thereby lock the pickup arm in its tilted and feeding position, the vertically movable rod 58 will be upheld during the next succeeding revolution of the hopper and the pickup arm will thus be maintained out of contact with the blanks in the hopper. As the cam engages the rod 58 on the next revolution, it will slightly raise the long arm of the pickup and so lessen the frictional contact of the blank heads with the guard 51, that the blanks remaining in the pickup arm will slide into the raceway and provided the latter has been emptied of a sufficient number of blanks to receive all of those remaining in the pickup arm, the latter will be released and tilt back again into the hopper, when it will again operate to collect another supply of blanks. Thus it will be observed that the pickup arm not only automatically collects a charge of nail blanks and feeds them to the race-way, but it is also automatically prevented from collecting a further supply of blanks so long as the race way is fully charged.

Figures 10, 11, 12, 13, 14, 15, 16:
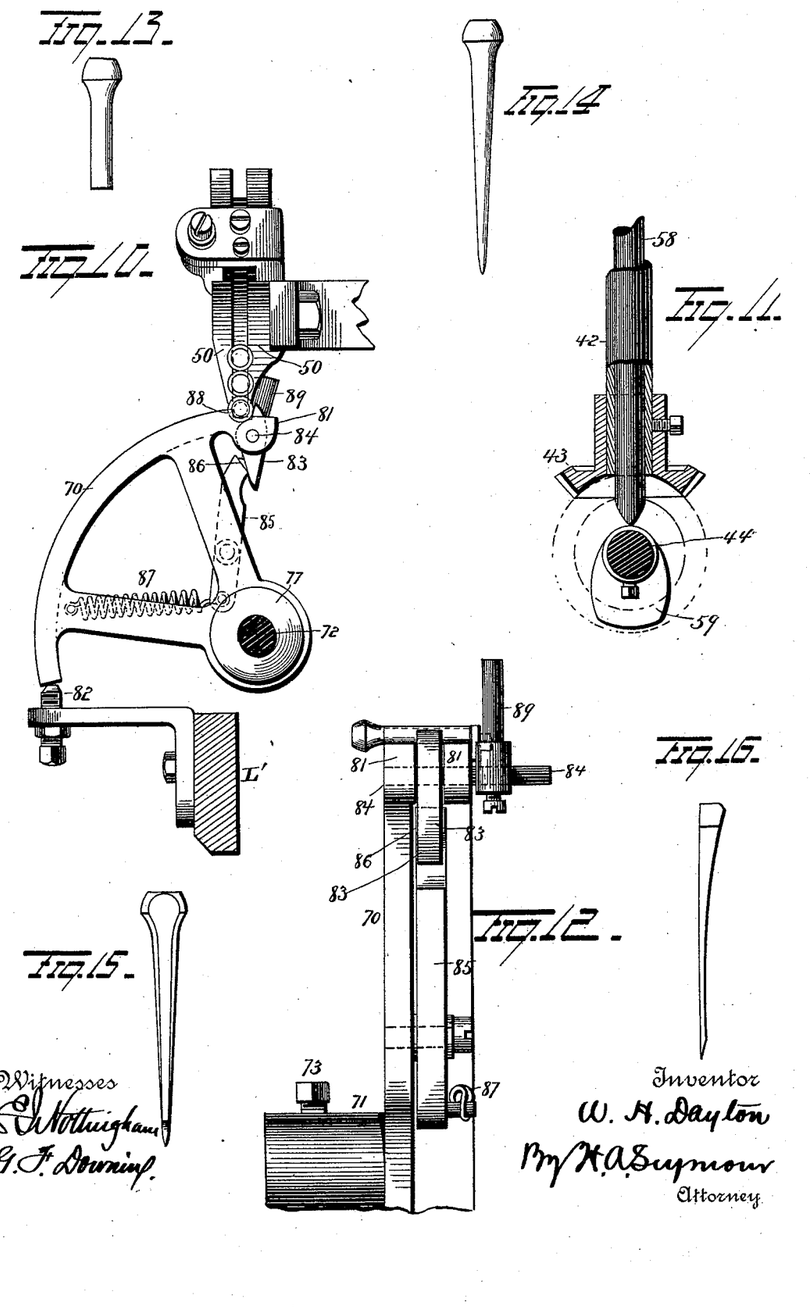
Fig. 10 is a detached view showing the blank carrier and raceway.
Fig. 11 is a detached view showing the lower end of the shaft which passes through the hopper and the cam for reciprocating the shaft.
Fig. 12 is an edge view of the blank-carrier.
Fig. 13 is a view of one of the headed blanks.
Fig. 14 represents the blank after swaging.
Figs. 15 and 16 represent side and edge views of a finished horseshoe nail.

I will now describe the mechanism for carrying the blank from the race way and delivering it to the gripping jaws. 70 is a sector shaped carrier, the hub 71 of which is fastened to the rock shaft 72 by means of a set screw 73. Rock-shaft 72 is journaled in a tubular bearing 73ᵃ, and is provided with a bevel gear 74 with which meshes a sector gear 75 attached to the arm 76 of a bell crank lever which is pivoted at 77. The other arm 78 of this lever has an anti-friction roller 79 journaled in its end, which engages a cam 80 fastened to the shaft Q. A spiral spring 81 is fastened at one end to the arm 78 while its opposite end is fastened to the frame of the machine. Spiral spring 81 serves to move the sector gear 75 upwardly and thus rotate the shaft 72 in one direction while the cam 80 operates through the arm 78 to move the sector gear downwardly and thus rotate the shaft 72 in the opposite direction. Sector carrier 70 is constructed with a peripheral bearing 81 which as will be observed by reference to Figs. 2 and 10 moves in close contact with the lower end of the race way and serves as a support for the blanks therein contained. The movement of the sector carrier is regulated and adjusted by means of the set screw 82. The forward end of the peripheral bearing 81 is cut away thereby forming a shoulder 88. A jaw 83 is secured to a pin 84 pivoted in the forward end of the carrier. One end of a pivoted lever 85 impinges against a beveled face 86 formed on the tail piece of jaw 83, while a spiral spring 87 secured at one end to the lower arm of lever 85 and at its opposite end to the sector carrier serves to move the jaw 83 toward the shoulder 88 on the carrier. A stud 89 is secured to the pin 84. When the carrier is moved to the position shown in Fig. 10, the stud 89 will engage the side of the race way and slightly rotate the pin 84, and the jaw 83 thereto attached and thus form an opening of sufficient width between the opposing faces of the jaw 83 and shoulder 88 for the admission of a nail blank which will drop therein. When the carrier is moved forwardly, the stud 89 is moved out of contact with the race-way, and hence the spring 87 will operate through the lever 85 to cause the jaw 83 to firmly grasp the shank of the blank and retain it against displacement. The blank as thus grasped by the jaws of the carrier is represented in Fig. 12, the head of the blank projecting outwardly from the side of the carrier. The carrier is then automatically moved from the position shown in Fig. 10 to the position shown in Fig. 7 and just before it has reached the latter position, the gripping jaws are automatically retracted so as not to obstruct the passage of the projecting heads of the nail blank. When the carrier is in the position shown in Fig. 7, the nail blank is brought into alignment with the opening between the dies F F while the head of the blank is brought into alignment with the recess formed in the gripping jaws. The machine then automatically advances the gripping jaws which are open and receives the head of the blank and then the jaws are firmly closed around the head. The carrier is then retracted and as the jaws serve to retain the head firmly grasped between them, the spring jaw on the carrier releases its hold on the shank of the blank.

Within a socket 90 on bracket 47 is removably secured a funnel 91 for the reception of oil which is gradually fed by means of a wire guide to the blank as it is being swaged.

Having described the function and relative arrangement of the various parts of my improved machine I will now give a brief description of its operation, and will first explain the method of forming the blanks which are supplied thereto. I first take any suitable wire—preferably of Siemens and Martins steel and cut it into suitable lengths to form blanks. These blanks are then headed in any suitable heading machine thereby producing headed blanks of the form illustrated in Fig. 13. The hopper 41 is filled or partly filled with headed blanks of the form illustrated in Fig. 13. During nearly a complete revolution of the hopper and its contents, the pickup arm projects downwardly into the blanks with the result that ordinarily one or a number of blanks will be caught between the arms of the pickup. At every revolution of the hopper, the pickup arm is tilted and its charge of blanks is delivered to the curved race way within which the blanks are retained by the periphery of the sector carrier. When the carrier is moved into the position illustrated in Fig. 10, its jaws will be opened and a blank will fall between the jaw and stationary shoulder on the periphery of the carrier. As the carrier is moved forward the spring actuated jaw serves to hold the blank firmly in place while the periphery of the carrier retains the remaining blanks within the race way from dropping out. The blank is carried by the carrier into the position shown in Figs. 1, 3, 5 and 7, whereby it is brought into alignment with the tapering groove formed on the meeting faces of the dies F, D. On the passage of the blank from the race way to the dies, the gripping jaws are slightly retracted to make room for the passage of the projecting head of the blank. When the blank is in the position referred to, table M is moved forward by the action of cam P, thus moving forward the gripping jaws which are in their open position. When the jaws have been moved forward a sufficient distance to cause the head of the nail to enter the recesses 7, 7, formed therein, the arm 26 will be raised through the action of cam 33 and depress the toggle arms and force the wedge 13 forwardly and between the rear ends of the gripping jaws thereby closing their forward ends and firmly clamping the head of the blank between them. Owing to the fact that the three pivotal bearings of the toggle arms 10 10 are brought into alignment, when fully depressed, the wedge 13 is securely locked against retraction until the blank is ready to be discharged. After the head of the blank has been thus grasped by the gripping jaws, the sector carrier is moved backwardly its spring jaw yielding to permit of its disengagement from the shank of the blank. Table M continues to advance and feeds the shank of the blank into the tapering groove formed between the dies F F. The outer ends of these semi-circular grooves are as will be observed made flaring so that in connection with the concave face plate J, the end of the shank is guided into the groove between the dies. Hence it will be seen that the head of the blank is firmly held between the gripping jaws while the shank of the blank is gradually fed forward as it is being swaged by the action of the dies F F. Owing to the fact that the dies are caused to act with great rapidity, imparting a number of blows to the blank during each revolution of the head $D^2$, the reduction of the blank is effected quite rapidly and it is quickly swaged into the form illustrated in Fig. 14. The swaging operation imparts a smooth and highly finished surface to every portion of the shank and under side of the head, and renders the shank perfectly tapered and circular in cross section throughout its length. The blank is subjected to the action of the swaging dies throughout the time the roller P' engages that portion of the periphery of cam P from the point 92 to 93, and then the gripper jaws are retracted and reach the limit of their outward movement when roller P' engages the point 94 in cam P. After the gripping jaws have been retracted, the end of face cam 38 will pass from beneath the lower end 32 of the plate 29 and allow the latter to drop and thus through the medium of the crank arm 26, and toggle lever withdraw the wedge 13 from between the rear ends of the gripping jaws and permit the spring bail to open the jaws and release the swaged blank, which drops into a suitable receptacle 95 bolted to the supporting frame of the machine. When in the revolution of cam P the roller P' has reached the point 94, the grippers will have been retracted to their extreme limit of movement, and while in this position the carrier moves past the outer ends of the gripping jaws the latter being sufficiently retracted to offer no obstruction to the projecting head of the blank. During that portion of the revolution of cam P in which roller P' engages the cam surface between the points 94 and 96, the gripping jaws will be moved forward a distance sufficient to cause the head of the blank to enter the recesses 7, 7, in the forward ends of the jaws and as soon as this point is reached the jaws are automatically closed, and the plate is moved forward by the action of the roller P' on that portion of cam P between the points 97 and 92 whereby the shank is fed into the tapering opening between the dies F F. Cam 80 on shaft Q is so arranged with relation to cam P, that while the blank is being swaged, the sector carrier will be moved rearwardly and receive another blank and by the time it has been moved forwardly again and into a position to feed the blank to the gripping jaws, the latter will have withdrawn and discharged its swaged blank and will be in position to receive a fresh blank. The blanks after having been swaged, are annealed and are then flattened between suitable dies which results in the production of a completed nail as illustrated in Figs. 15 and 16.

It is evident that many changes might be made in the form and construction and relative arrangement of the various parts of my improved machine without involving a departure from the spirit and essence of my invention and hence I would have it understood that I do not limit myself to the particular construction and arrangement of parts shown and described, but, Having fully described my invention, what I claim as new, and desire to secure by Letters Patent, is—

1. The combination with a rotary head and swaging dies carried thereby, of a reciprocating table, a gripping jaw head or stock carried by the table, and a spring for receiving the end thrust of the head or stock, substantially as set forth.

2. The combination with a rotary head swaging dies and sliding hammers, of a face plate constructed with a concave recess and a central aperture; adjustable plates secured to the face of the rotary head, and pins fastened to the adjustable plates, said pins entering elongated recesses in the sliding hammers and regulating their throw, substantially as set forth.

3. The combination with a reciprocating table, a rock-shaft and yielding stock mounted on said table, pivotal gripping jaws connected with one end of the yielding stock, a sliding rod 12 provided with a wedge for closing the jaws, toggle levers 10, 10, 11 and means for actuating the rock-shaft and thereby insuring the opening and closing of the jaws, substantially as set forth.

4. The combination with gripping jaws and a reciprocating rod having a wedge pointed end, of toggle levers, rock-shafts, crank arm, vertically movable plate provided with a guide way for the reception of a pin on the crank arm and a cam, substantially as set forth.

5. The combination with gripping jaws mounted in a yielding stock, of a wedge for closing the gripping jaws, toggle levers, a cam provided with a projection as at 35 to force the pivotal bearings into alignment and subject the stock to the tension of its spring abutment, and means for transmitting motion from the cam to the toggle levers, substantially as set forth.

6. The combination with the gripping jaws, reciprocating wedge, toggle levers and oscillating arm, of a vertically movable plate, and a cam provided with a recess and with a face cam 38 which latter supports the vertically movable plate until it can drop suddenly into the recess in the cam and thereby cause the sudden opening of the gripping jaws, substantially as set forth.

7. The combination with the reciprocating plate M and laterally adjustable plate mounted thereon, of the gripper stock or head mounted in said laterally adjustable plate, substantially as set forth.

8. The combination with a rotary head and swaging dies carried thereby, of a reciprocating table, gripping jaws mounted in a stock yieldingly and laterally adjustably mounted on said reciprocating table, and means for opening and closing said gripping jaws, substantially as set forth.

9. In a horse-shoe nail machine the combination with a rotary head and swaging dies carried thereby, of a race-way for receiving headed blanks, a rotary hopper, a pick-up arm, means for actuating the pick up arm and causing it to convey blanks from the hopper to the race-way, and means for automatically preventing the pickup arm from gathering blanks until it has first discharged all of the blanks held thereby into the raceway, substantially as set forth.

10. In a horse shoe nail machine the combination with a race-way and gripping jaws, of an oscillating blank carrier, a bevel gear 74, sector gear 75 bell-crank lever 76, 78 and cam 80, substantially as set forth.

11. In a horse shoe nail machine the combination with a rotary head and swaging dies carried thereby, of a reciprocating table, a stock mounted on said table, means to provide a yielding lengthwise movement to said stock, gripping jaws connected with the stock, means for reciprocating the table and thereby moving the jaws to feed and retract the blank, substantially as set forth.

12. In a horse shoe nail machine, the combination with a rotary head and swaging dies carried thereby, of a reciprocating table, a stock mounted on said table, means for imparting a lateral adjustment to the stock, means for providing a longitudinally yielding movement to the stock, and gripping jaws and means for actuating the same combined with said stock, substantially as set forth.

13. In a horse shoe nail machine the combination with a reciprocating table, of the gripping jaw stock, uprights 21, 21 and spring 18 provided at its ends with open slots 19, 19, substantially as set forth.

14. In a horse shoe nail machine the combination with a rotary head and swaging dies carried thereby, of a reciprocating table, a gripping jaw stock mounted on said table, means for adjusting the stock laterally, means for allowing the stock an endwise yielding movement, and toggle levers for reciprocating a wedge for closing the jaws, substantially as set forth.

15. In a horse shoe nail machine the combination with a standard provided with a cylindrical bearing at its upper end, sleeve $a$ mounted in said bearing and adjustably secured therein by the set screw $a'$, stationary head B formed on one end of sleeve $a$, a shaft D journaled in said sleeve; a rotary head formed integral with one end of the shaft, and a band pulley secured to its opposite end, substantially as set forth.

In testimony whereof I have signed this specification in the presence of two subscribing witnesses.

WILLIAM H. DAYTON.

Witnesses:
CHAS. L. MCNEIL,
ALBERT SPERRY.